US007383393B2

(12) United States Patent
Al Sukhni et al.

(10) Patent No.: US 7,383,393 B2
(45) Date of Patent: Jun. 3, 2008

(54) SYSTEM AND METHOD FOR COOPERATIVE PREFETCHING

(75) Inventors: Hassan F. Al Sukhni, Austin, TX (US); James C. Holt, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 399 days.

(21) Appl. No.: 11/261,357

(22) Filed: Oct. 28, 2005

(65) Prior Publication Data

US 2007/0101066 A1     May 3, 2007

(51) Int. Cl.
*G06F 12/00* (2006.01)
(52) U.S. Cl. ...................................... 711/137
(58) Field of Classification Search ................ 711/137
See application file for complete search history.

(56) References Cited

U.S. PATENT DOCUMENTS

2003/0110366 A1* 6/2003 Wu et al. ................... 712/225
2004/0054990 A1* 3/2004 Liao et al. .................. 717/124

OTHER PUBLICATIONS

Collins et al., Speculative Precomputation: Long-range Prefetching of Delinquent Loads, 28th International Symposium on Computer Architecture, 2001.*
Wang et al., Speculative Precomputation: Exploring the Use of Multithreading for Latency, Intel Technology Journal, Issue 1- vol. 6, 2002.*
Collins et al., Dynamic Speculative Precomputation, 34th Annual International Symposium on Computer Architecture, 2001.*
Cuhna, Speculative Precomputation, 5th Internal Conference on Computer Architecture, 2004.*
Sherwood, et al., Predictor-Directed Stream Buffers, Proceedings of the 33th International Symposium on Microarchitecture, 2000.*
Brown et al., Speculative Precomputation on Chip Multiprocessors, 6th Workshop on Multithreaded Execution, Architecture, and Compilation, 2002.*

* cited by examiner

*Primary Examiner*—Reginald Bragdon
*Assistant Examiner*—Aracelis Ruiz (57) ABSTRACT

A first prefetch engine from a first plurality of prefetch engines is allocated to a first load instruction in response to a buffer miss of an iteration of the first load instruction in a program stream. The first plurality of prefetch engines include prefetch engines for prefetching data from memory to a buffer based on a predicted stride. A second prefetch engine from a second plurality of prefetch engines is allocated to the first load instruction in response to the buffer miss. The second plurality of prefetch engines include prefetch engines for prefetching data from memory to the buffer based on an instruction loop representative of a sequence of instructions that affect an address value associated with an allocated load instruction. One of the first or second prefetch engines is deallocated if the other prefetch engine achieves a prefetch performance greater than a first threshold value.

20 Claims, 7 Drawing Sheets

| INSTRUCTION | ID | PI | TYPE | CONSUMES | PRODUCES |
|---|---|---|---|---|---|
| LD r5, 4(r4) | 1 | | LD | A | B |
| LD r7, 16(r1) | 2 | | LD | C | D |
| ADD r1, 32, r1 | 3 | | AD | C | E |
| LD r2, 0(r1) | 4 | 3 | LD | E | F |
| LD r3, 4(r2) | 5 | 4 | LD | F | G |
| LD r6, 4(r1) | 6 | 3 | LD | E | H |
| LD r4, 8(r1) | 7 | 3 | LD | E | I |

*FIG. 5*

| INSTRUCTION | ID | PI | TYPE | CONSUMES | PRODUCES |
|---|---|---|---|---|---|
| LD r5, 4(r4) | 1 | 7 | LD | I | J |
| LD r7, 16(r1) | 2 | 3 | LD | E | K |
| ADD r1, 32, r1 | 3 | 3 | AD | E | E |
| LD r2, 0(r1) | 4 | 3 | LD | E | F |
| LD r3, 4(r2) | 5 | 4 | LD | F | G |
| LD r6, 4(r1) | 6 | 3 | LD | E | H |
| LD r4, 8(r1) | 7 | 3 | LD | E | I |

*FIG. 6*

| INSTRUCTION | ID | PI | TYPE | CONSUMES | PRODUCES |
|---|---|---|---|---|---|
| LD r5, 4(r4) | 1 | 7 | LD | I | J |
| ~~LD r7, 16(r1)~~ | ~~2~~ | ~~3~~ | ~~LD~~ | ~~E~~ | ~~H~~ |
| ADD r1, 32, r1 | 3 | 3 | AD | E | E |
| ~~LD r2, 0(r1)~~ | ~~4~~ | ~~3~~ | ~~LD~~ | ~~E~~ | ~~F~~ |
| ~~LD r3, 4(r2)~~ | ~~5~~ | ~~4~~ | ~~LD~~ | ~~F~~ | ~~G~~ |
| ~~LD r6, 4(r1)~~ | ~~6~~ | ~~3~~ | ~~LD~~ | ~~E~~ | ~~H~~ |
| LD r4, 8(r1) | 7 | 3 | LD | E | I |

SYSTEM AND METHOD FOR COOPERATIVE PREFETCHING

CROSS-REFERENCE TO RELATED APPLICATIONS

The present application is related to U.S. patent application Ser. No. 11/261,171 entitled "SYSTEM AND METHOD FOR DECOUPLED PRECOMPUTATION PREFETCHING," filed on even date herewith and having common inventorship.

FIELD OF THE DISCLOSURE

The present disclosure is related generally to data processing systems and more particularly to prefetching in data processing systems.

BACKGROUND

Prefetching data from memory into a buffer is a common approach for reducing the effects of memory latency during load operations in processing systems. Common prefetching techniques are broadly classified into two types: prediction prefetching or precomputation prefetching. Prediction prefetching techniques rely on the context of the data accesses to predict and prefetch data. Prediction prefetching techniques are particularly advantageous when prefetching data that has regular access patterns, as frequently found in numerical and scientific applications. An exemplary prediction prefetching technique includes a stride-based prefetching technique that utilizes a stride value that defines the identified access pattern.

In contrast, conventional precomputation prefetching techniques rely on the execution of a version of the main program at a separate hardware engine so as to run ahead of the execution of the main program at the main processing engine. Precomputation prefetching techniques are grouped into two types: coupled techniques or decoupled techniques. Coupled precomputation prefetching techniques rely on the execution of a pre-marked instruction in the main program to trigger the precomputation execution. As a result, coupled precomputation prefetching techniques typically cannot prefetch in time for programs that have little time between the trigger and when the prefetched data is needed. Such instances are common in processing systems that utilize register renaming and out-of-order execution that results in a shortened time between the loading of values and their use in the program. Conventional decoupled precomputation techniques have been designed in an attempt to overcome the timeliness problem present in coupled techniques. These conventional techniques allow a prefetch engine to execute several iterations ahead of the program at the main processor. While these conventional decoupled precomputation prefetching techniques can be relatively effective for programs that have a static traversal order along data structures, these conventional techniques fail to account for instances where the traversal path changes between access iterations. Accordingly, improved techniques for prefetching data in a processing system would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

In accordance with one aspect of the present disclosure, a method is provided. The method includes identifying a first load instruction of a program stream executed by a processing unit as delinquent based on a buffer miss during an iteration of the first load instruction. The method further includes performing a first prefetching process at a first prefetch unit for one or more iterations of the first load instruction for prefetching data from memory into a buffer. The first prefetching process is based on an expected stride pattern of the one or more iterations of the first load instruction. The method also includes performing a second prefetching process at a second prefetch unit for one or more iterations of the first load instruction for prefetching data from memory into the buffer. The second prefetching process is based on an instruction loop that represents a subset of a sequence of instructions between iterations of the first load instruction that affect an address value associated with the first load instruction. The method additionally includes determining a first confidence value for the first prefetching process based on a prefetch performance of the first prefetching process and determining a second confidence value for the second prefetching process based on a prefetch performance of the second prefetching process. The method further includes terminating execution of one of the first prefetching process or the second prefetching process based on a comparison of the first confidence value and the second confidence value.

In one embodiment, the first prefetching process is terminated if the first confidence value is less than the second confidence value, and the second prefetching process is terminated if the second confidence value is less than or equal to the first confidence value. Moreover, determining the first confidence value includes incrementing the first confidence value if a buffer hit occurs in the data prefetched by the first prefetching process during an iteration of the first load instruction, and decrementing the first confidence value if a buffer miss occurs during an iteration of the first load instruction. Determining the second confidence value includes incrementing the second confidence value if a buffer hit occurs in the data prefetched by the second prefetching process during an iteration of the first load instruction and decrementing the second confidence value if a buffer miss occurs during an iteration of the first load instruction.

In another embodiment, the first prefetching process is performed by a first prefetch unit and the second prefetching process is performed by a second prefetch unit different than the first prefetching unit. The first and second prefetching processes are performed substantially in parallel. Performing the second prefetching process also can include generating a first prefetching graph based on a sequence of instructions of the program stream that are committed to an execution pipeline of the processing unit between a first iteration and a second iteration of a first load instruction, generating a second prefetching graph from the first prefetching graph based on a first subset of the sequence of instructions that affect an address value associated with the first load instruction, as well as generating the instruction loop based on the second prefetching graph.

Generating the first prefetching graph includes filtering out an instruction from the sequence of instructions based on a comparison of an instruction type of the instruction with an identified set of one or more instruction types. Generating the first prefetching graph further includes filtering out a second load instruction from the sequence of instructions based on a comparison of an address value of the first load instruction with an address value of the second load instruction. Generating the second prefetching graph includes filtering out an identified instruction of the sequence of instructions that uses an operand value that is not affected by another instruction of the sequence of instructions that is prior to the identified instruction.

In accordance with another aspect of the present disclosure, another method is provided. The method includes allocating a first prefetch engine from a first plurality of prefetch engines to a first load instruction in response to a buffer miss of an iteration of the first load instruction in a program stream. The first plurality of prefetch engines including prefetch engines to prefetch data from memory to a buffer based on a predicted stride. The method further includes allocating a second prefetch engine from a second plurality of prefetch engines to the first load instruction in response to the buffer miss of the iteration of the first load instruction, the second plurality of prefetch engines including prefetch engines to prefetch data from memory to the buffer based on an instruction loop representative of a sequence of instructions that affect an address value associated with an allocated load instruction. The method also includes deallocating one of the first or second prefetch engines if the other of the first or second prefetch engines achieves a prefetch performance greater than a first threshold value.

In one embodiment, the method further includes allocating a third prefetch engine from one of the first or second pluralities of prefetch engines if the prefetch performance of the other of the first or second prefetch engines achieves a prefetch performance less than a second threshold. Alternately, the method includes identifying a first available prefetch engine of the first plurality of prefetch engines, wherein the first prefetch engine includes the first available prefetch engine, and identifying a second available prefetch engine of the second plurality of prefetch engines. The second prefetch engine includes the second available prefetch engine. A prefetch engine is characterized as being available either if it is not allocated or if it is allocated and a prefetch performance associated with the prefetch engine is less than a second threshold value.

In another embodiment, the method further includes deallocating both of the first and second prefetch engines if neither of the first or second prefetch engines achieves a prefetch performance greater than the first threshold value. Additionally, the program stream further includes multiple iterations of a second load instruction and the method further includes allocating a third prefetch engine from the first plurality of prefetch engines to the second load instruction in response to a buffer miss of an iteration of the second load instruction in the program stream and allocating a fourth prefetch engine from the second plurality of prefetch engines to the second load instruction in response to the buffer miss of the iteration of the second load instruction. The method also includes deallocating one of the third or fourth prefetch engines if the other of the third or fourth prefetch engines achieves a prefetch performance greater than the first threshold value.

In accordance with yet another embodiment of the present disclosure, a system is provided. The system includes a processing unit to execute a program stream including multiple iterations of a first load instruction and a first plurality of prefetch engines. Each prefetch engine of the first plurality of prefetch engines is to prefetch data from memory to a buffer based on a predicted stride of a load instruction allocated to the prefetch engine. The system further includes a second plurality of prefetch engines. Each prefetch engine of the second plurality of prefetch engines is to prefetch data from memory to a buffer based on based on an instruction loop representative of a sequence of instructions that affect an address value associated with a load instruction allocated the prefetch engine. A first prefetch engine from the first plurality of prefetch engines is allocated to the first load instruction in response to a buffer miss of an iteration of the first load instruction in the program stream. A second prefetch engine from the second plurality of prefetch engines is allocated to the first load instruction in response to the buffer miss of the iteration of the first load instruction. One of the first or second prefetch engines is deallocated if the other of the first or second prefetch engines achieves a prefetch performance greater than a first threshold value.

In one embodiment, a third prefetch engine from one of the first or second pluralities of prefetch engines is allocated if the prefetch performance of the other of the first or second prefetch engines achieves a prefetch performance less than a second threshold value. Both of the first and second prefetch engines are deallocated if neither of the first or second prefetch engines achieves a prefetch performance greater than the first threshold value.

In another embodiment, the program stream further includes multiple iterations of a second load instruction. Accordingly, a third prefetch engine from the first plurality of prefetch engines is allocated to the second load instruction in response to a buffer miss of an iteration of the second load instruction in the program stream and a fourth prefetch engine from the second plurality of prefetch engines is allocated to the second load instruction in response to the buffer miss of the iteration of the second load instruction. One of the third or fourth prefetch engines is deallocated if the other of the third or fourth prefetch engines achieves a prefetch performance greater than the first threshold value.

FIGS. 1-9 illustrate exemplary techniques for decoupled precomputation prefetching. A delinquent load instruction is identified and assigned to a precomputation prefetching engine (PCE). The PCE then builds a dependence prefetch graph by recording committed instructions between iterations of the delinquent load instruction. The resulting dependence prefetch graph then is further refined by removing instructions that are not relevant to the load address associated with the delinquent load instruction. The instruction loop represented by the resulting modified dependence prefetch graph is then repeatedly executed by the PCE for prefetching data for use by one or more iterations of the load instruction in the program stream. Additionally, the prefetching performance of the instruction loop is monitored, and if a confidence associated with the instruction loop falls below a threshold value, the PCE is retired or re-synchronized.

Figure 10:
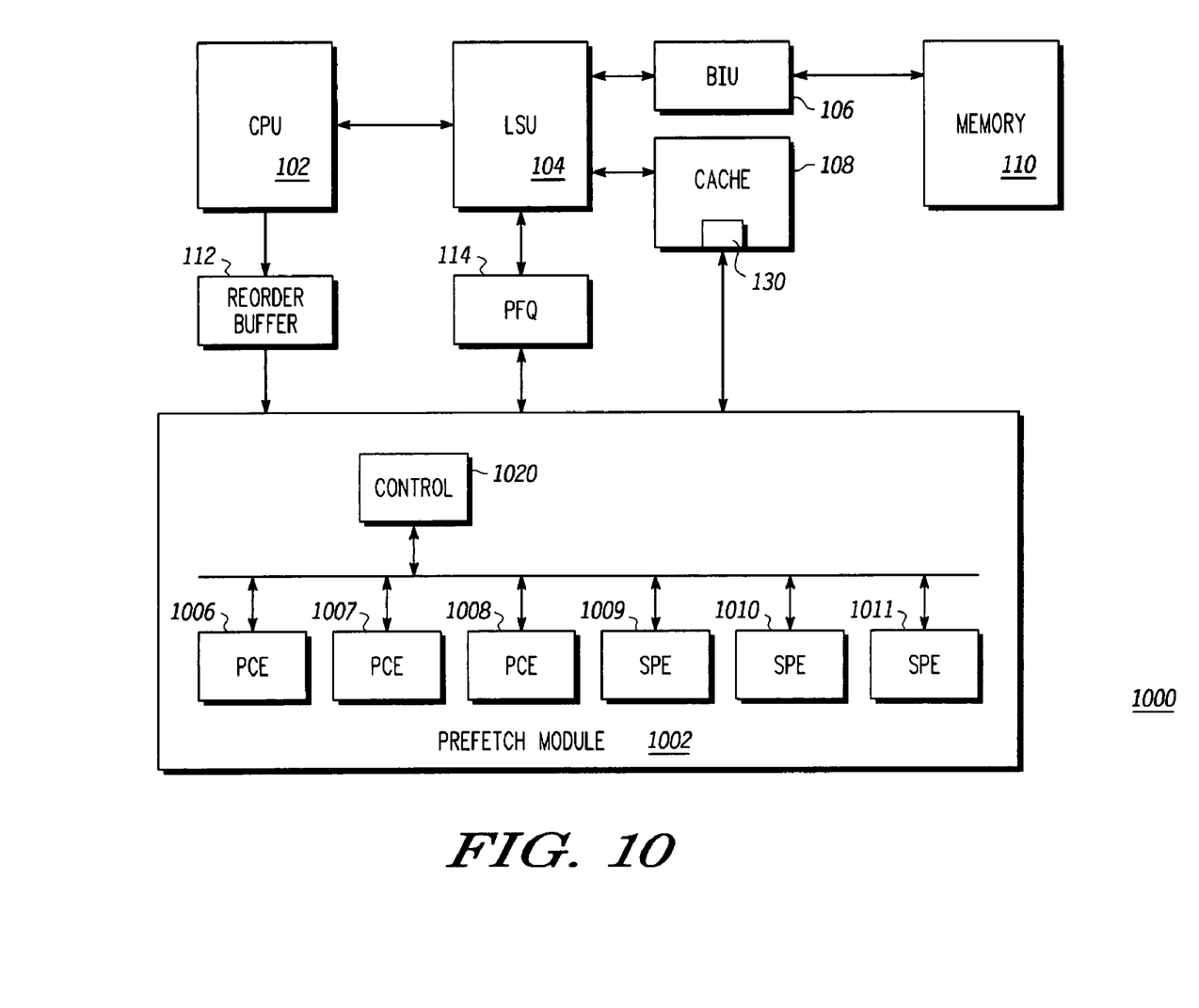
FIG. 10 is block diagram illustrating an exemplary processing system utilizing collaborative prefetching in accordance with another embodiment of the present disclosure.
Figure 11:
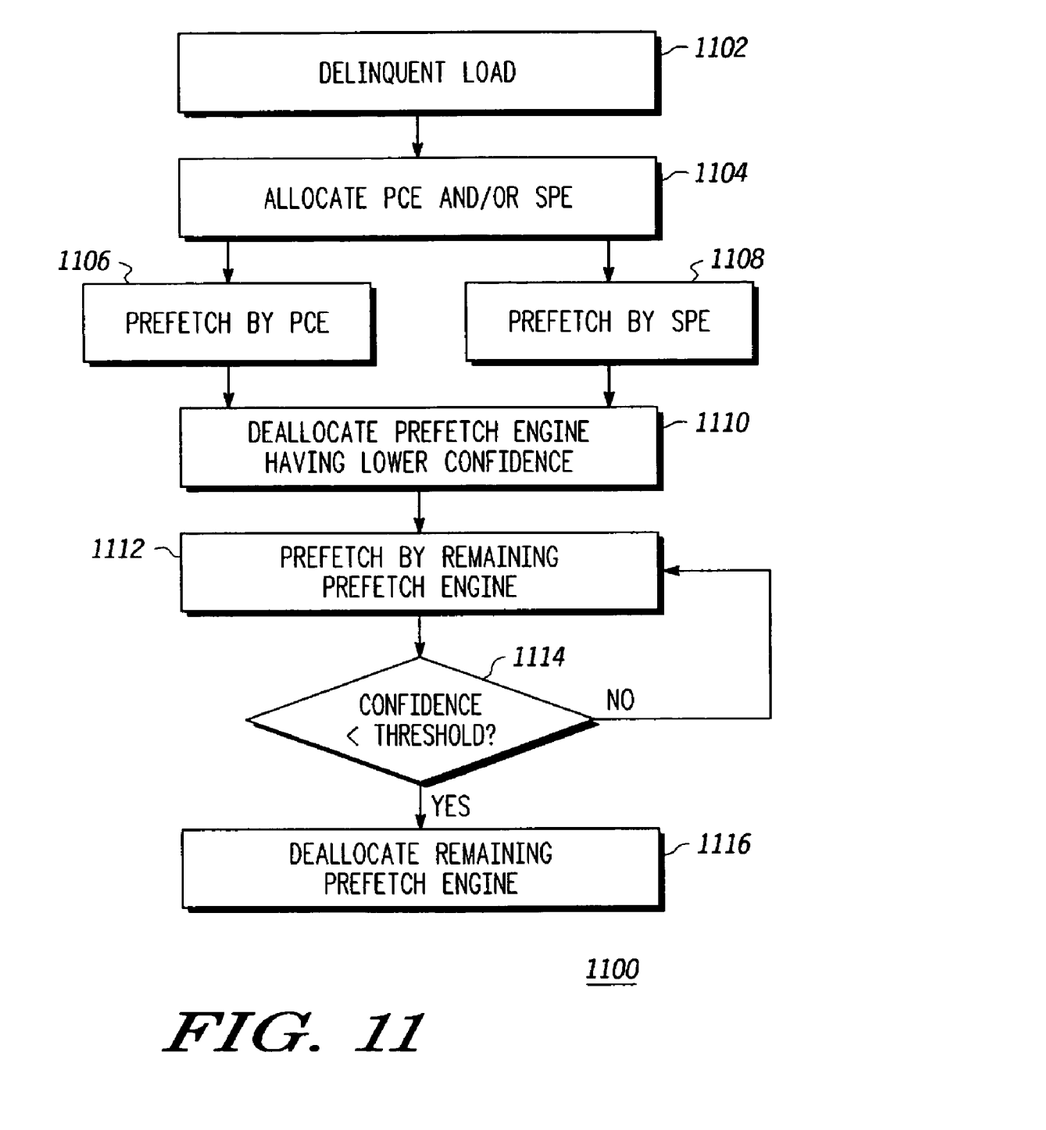
FIG. 11 is a flow diagram illustrating an exemplary method for collaborative prefetching used by the processing system of FIG. 10.

FIGS. 10 and 11 illustrate exemplary techniques for collaborative prefetching. A delinquent load instruction is allocated to both a PCE and a stride-based (or predictive) prefetching engine (SPE), if available. Both the PCE and the SPE implement their respective prefetching techniques to prefetch data for subsequent iterations of the load instruction. The prefetching performance of each is monitored and the prefetching engine having the lower confidence is retired and the remaining prefetch engine continues to prefetch data for one or more iterations of the load instruction.

The term dependence prefetch graph, as used herein, refers to a listing, sequence or other representation of one or more instructions that are committed in an execution pipeline between two iterations of a delinquent load instruction and identified as potentially relevant to the load address used by the delinquent load instruction. Exemplary implementations of dependence prefetch graphs are described herein. Using the guidelines provided herein, those skilled in the art may utilize other formats or implementations of dependence prefetch graphs as appropriate without departing from the scope of the present disclosure.

Figure 1:
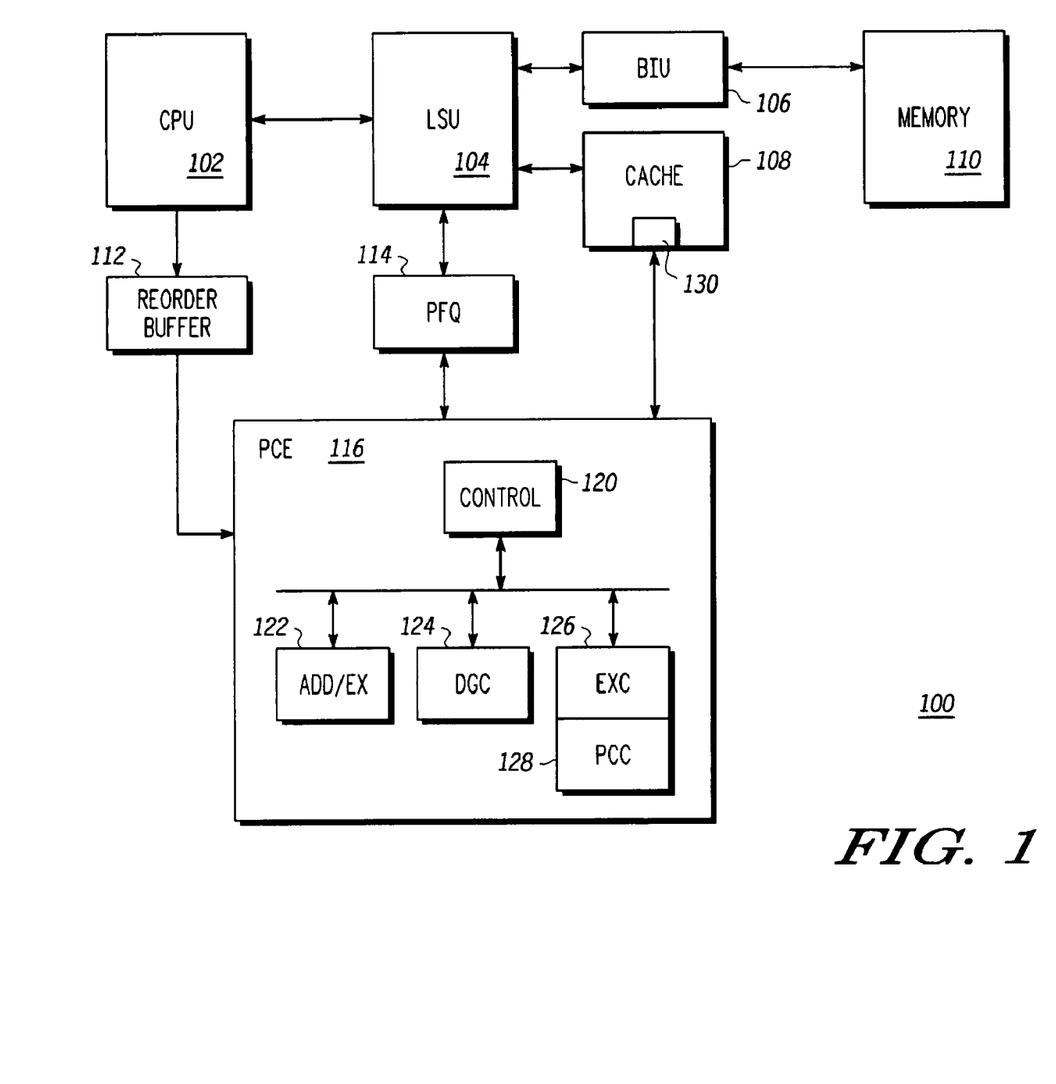
FIG. 1 is a block diagram illustrating an exemplary processing system utilizing decoupled dynamic dependence prefetching in accordance with one embodiment of the present disclosure.

For ease of discussion, the techniques disclosed herein are described in the context of a processing system utilizing a cache (e.g., a level 1 (L1) cache) to store data (e.g., prefetched data from memory) as depicted by FIGS. 1 and 10. However, these techniques may be implemented using other types of buffers, such as dedicated caches, L2 caches, register files, and the like, without departing from the scope of the present disclosure.

Referring to FIG. 1, an exemplary processing system 100 that utilizes decoupled precomputation prefetching is illustrated. As shown, the system 100 includes a main processing engine, such as central processing unit (CPU) 102, a load-store unit (LSU) 104, a bus interface unit (BIU) 106, a buffer (such as cache 108), memory 110 (e.g., system random access memory (RAM)), a reorder buffer 112, a prefetch queue (PFQ) 114 and at least one precomputation prefetch engine (PCE) 116. The PCE 116 includes a control module 120, an add/execute module 122, a dependence graph cache (DGC) 124, an execution cache (EXC) 126 and a precomputation control counter (PCC) 128.

In operation, the CPU 102 executes a program stream of instructions that includes one or more load instructions that utilize data stored in memory 110 or in cache 108. Committed instructions are stored in the reorder buffer 112. When the CPU 102 executes a load instruction, a request for the load data associated with the load instruction is provided to the LSU 104. The LSU 104, in turn, accesses the cache 108 to determine whether the cache 108 contains the requested load data. If so (i.e., there is a cache hit), the LSU 104 loads the data from the cache 108 and provides it to the CPU 102. If the load data is not present in the cache 108 (i.e., there is a cache miss), the LSU 104 loads the requested data from the memory 110 via the BIU 106.

The PCE 116 prefetches data for use by some or all of the load instructions in parallel with the execution of the program stream by the CPU 102. The control module 120 generates a dependence prefetch graph representative of a sequence of instructions executed by the CPU 102 between two iterations of a delinquent load instruction in the program stream and stores it in the DGC 124. After verifying the dependence prefetch graph represents the likely sequence of instructions occurring between iterations of the delinquent load instruction, the control module 120 further refines the dependence prefetch graph by filtering out instructions that are not relevant to the load address value associated with the load instruction. The resulting refined dependence prefetch graph represents an instruction loop that is repeatedly executed by the PCE 116 independent of any triggering event at the CPU 102. A representation of the refined dependence prefetch graph is stored in the EXC 126. The add/execute module 122 executes the instructions of the instruction loop by indexing the instructions in the EXC 126 using the counter value from the PCC 128. Memory access operations resulting from the instruction loop are queued in the PFQ 114 (if not already in the cache 108), which are then accessed by the LSU 104 so as to load the corresponding data from the memory 110.

Additionally, the control module 120 monitors the prefetching performance of the executed instruction loop by monitoring the cache hit/miss performance of iterations of the load instruction via a read port 130 of the cache 108 as the program stream is executed by the CPU 102. Alternately, in one embodiment, the LSU 104 monitors the cache 108 and provides prefetch performance information (e.g., indications of cache hits or misses) to the control module 120 of the PCE 116. The control module 120 adjusts a confidence associated with the PCE 116 and the PCE 116 is retired from prefetching for the particular load instruction when its confidence falls below a certain threshold or level.

Figure 2:
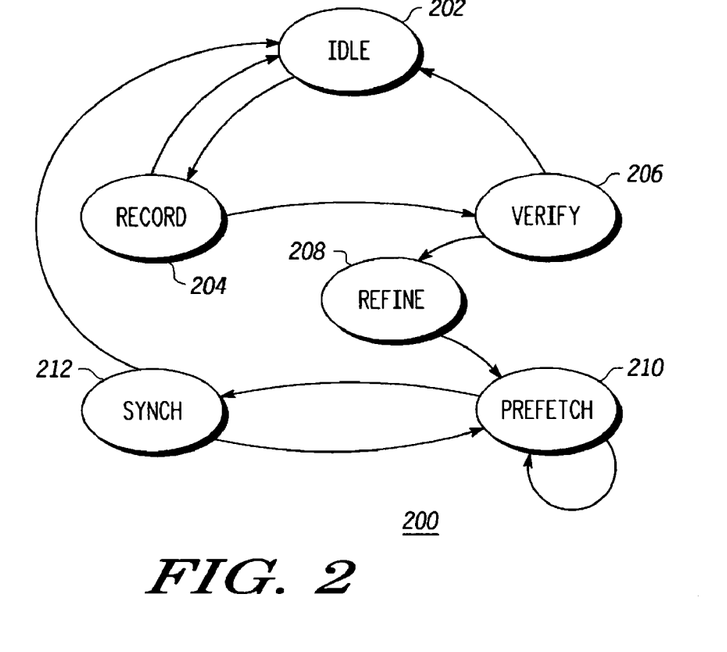
FIG. 2 is a state diagram illustrating an exemplary state machine implemented by a precomputation prefetching engine of FIG. 1.

Referring to FIG. 2, an exemplary state machine 200 depicting the operational modes of the PCE 116 is illustrated in accordance with at least one embodiment of the present disclosure. As depicted, the state machine 200 includes an idle mode 202, a record mode 204, a verify mode 206, a refine mode 208, a prefetch mode 210 and a synch mode 212. The idle mode 202 represents the operation of the PCE 116 when it is not allocated to a delinquent load instruction. Upon the detection of a delinquent load instruction, a PCE 116 is allocated. In the event that the processing system 100 utilizes multiple PCEs 116 and none are available, the confidence of the PCE 116 having the lowest confidence is further reduced, eventually resulting in the retirement of the PCE 116 when its confidence falls below a minimum threshold and thereby making the retired PCE 116 available for allocation to another delinquent load instruction.

Once allocated to a delinquent load instruction, the PCE 116 enters record mode 204 whereby the PCE 116 records committed instructions between two iterations of the delinquent load instruction and attempts to construct an instruction loop from the recorded instructions, where the instruction loop is represented by a dependence prefetch graph constructed from the recorded instructions. If the PCE 116 is unable to create the instruction loop, the PCE 116 returns to the idle mode 202. Otherwise, the PCE 116 enters verify mode 206. An exemplary implementation of record mode 204 is discussed herein with respect to FIGS. 3-6.

While in verify mode 206, the PCE 116 verifies the generated instruction loop by monitoring the committed instructions occurring in a subsequent iteration of the delinquent load instruction. If the instruction loop is verified as likely to appear in the program stream again, the PCE 116 enters refine mode 208. Otherwise, the instruction loop cannot be verified and the PCE 116 is retired by entering idle mode 202. An exemplary implementation of verify mode 206 is discussed with respect to FIG. 4.

In refine mode 208, the PCE 116 refines or otherwise reduces the instruction loop so as to remove instructions that are not relevant, or do not affect, the load address value utilized by the delinquent load instruction. As discussed in greater detail below, refinement techniques utilized include filtering out instructions based on instruction type, address comparison, or by a producer/consumer analysis.

After refining the instruction loop, flow proceeds to prefetch mode 210 and the instruction loop is repeatedly executed by the PCE 116 while in the prefetch mode 210 for prefetching data that is utilized by subsequent iterations of the delinquent load instruction when it is executed in the program stream at the CPU 102. A confidence level or value for the prefetch operations of the PCE 116 is continuously adjusted based on the prefetching performance of the PCE 116. In the event that there is a cache hit for an iteration of the delinquent load instruction, the confidence of the prefetching performance of the PCE 116 is increased. Otherwise, in the event that there is a cache miss for an iteration of the delinquent load instruction, the PCE 116 enters synch mode 212, during which the PCE 116 attempts to update the fields of the instructions in the instruction loop. If the instructions of the instruction loop cannot be updated or the confidence is less than a minimum threshold, the PCE 116 is retired and return to idle mode 202. Otherwise, the PCE 116 reenters prefetch mode 210.

Figure 3:
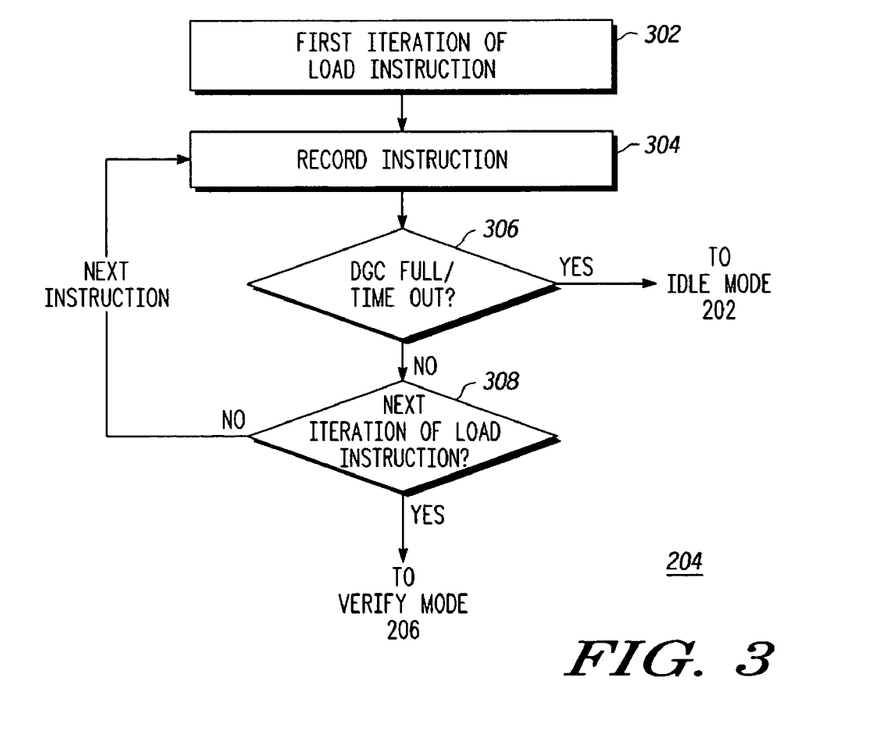
FIG. 3 is a flow diagram illustrating an exemplary record mode of the state machine of FIG. 2.

Referring to FIG. 3, a flow diagram depicting an exemplary implementation of the record mode 204 of state machine 200 of FIG. 2 is illustrated in accordance with at least one embodiment of the present disclosure. At block 302, a first iteration of the committed delinquent load instruction is detected and the PCE 116 initiates the recordation of committed instructions. The first iteration of the delinquent load instruction can be the same iteration that triggered the allocation of the PCE 116 or it may be a subsequent iteration. At block 304, a committed instruction that is committed after the first iteration of the delinquent load instruction is received by the control module 120 for potential recordation in the DGC 124. The instructions are recorded as they commit out of the reorder buffer 112 so that the instructions are received according to the program order, as well as keeping the PCE 116 out of the core path of the execution pipeline of the CPU 102.

As part of the recordation process, the PCE 116 records information about each relevant instruction in its corresponding DGC entry. This information can include: a unique ID for each instruction for ease of reference; the program counter (PC) of the instruction for use during verify mode 202 (FIG. 2); the type of instruction (e.g., add instruction or a load instruction); a consume value representative of the value stored in the base register that the instruction "consumed" when it is first recorded (note that this value is not the register number but the value stored by the register); a produce value that represents the result of the add instruction recorded or the loaded value of the load instruction stored; a producer ID (PI) that is initialized to a certain value (e.g., −1) and points to producer entries in the DGC upon identifying a producer; and an offset value of the instruction where each load or add instruction is assumed to have a base value (the consume value) and an offset value, which, in one embodiment, are assumed to be constant immediate values even if they are computed and passed in registers. The consume value of a recorded instruction is updated either by the instruction during verify mode 202 or by the PCE 116 when it executes the instruction loop represented by the dependence prefetch graph during a prefetching phase (discussed herein). The produce value is similarly updated.

It will be appreciated that the program stream may have only one iteration of a delinquent load instruction or that there may be an excessively large number of instructions that are executed between iterations of the delinquent load instruction. Accordingly, in some instances the PCE 116 may be unable to generate an accurate dependence prefetch graph due to the single iteration or it may be undesirable to do so due to the excessive size of the resulting instruction loop. Accordingly, at block 306, the control module 120 checks the fullness of the DGC 124 or the status of a timer. In the event that the DGC 124 does not have an available entry in which to record information about the instruction or in the event that the recordation process has timed out, it may be assumed that a suitable instruction loop cannot be created for the delinquent load instruction, so the PCE 115 is retired and returns to idle mode 202 to await allocation to another delinquent load instruction.

Otherwise, at block 308 the control module 120 checks the next committed instruction to determine whether it is the next iteration of the delinquent load instruction (e.g., by comparing the program counter (PC) value of the next committed instruction with the PC value of the delinquent load instruction). If it is not the next iteration, the process returns to block 304 for processing of the next committed instruction.

If the next committed instruction is the next iteration of the delinquent load instruction, the PCE 116 terminates the recordation of committed instructions. At this point, the dependence prefetch graph represented by the entries of the DGC 124 is representative of those instructions that may be relevant to the address load value used by iterations of the delinquent load instruction. The PCE 116 then enters verify mode 206 to verify the sequence of instructions.

Figure 4:
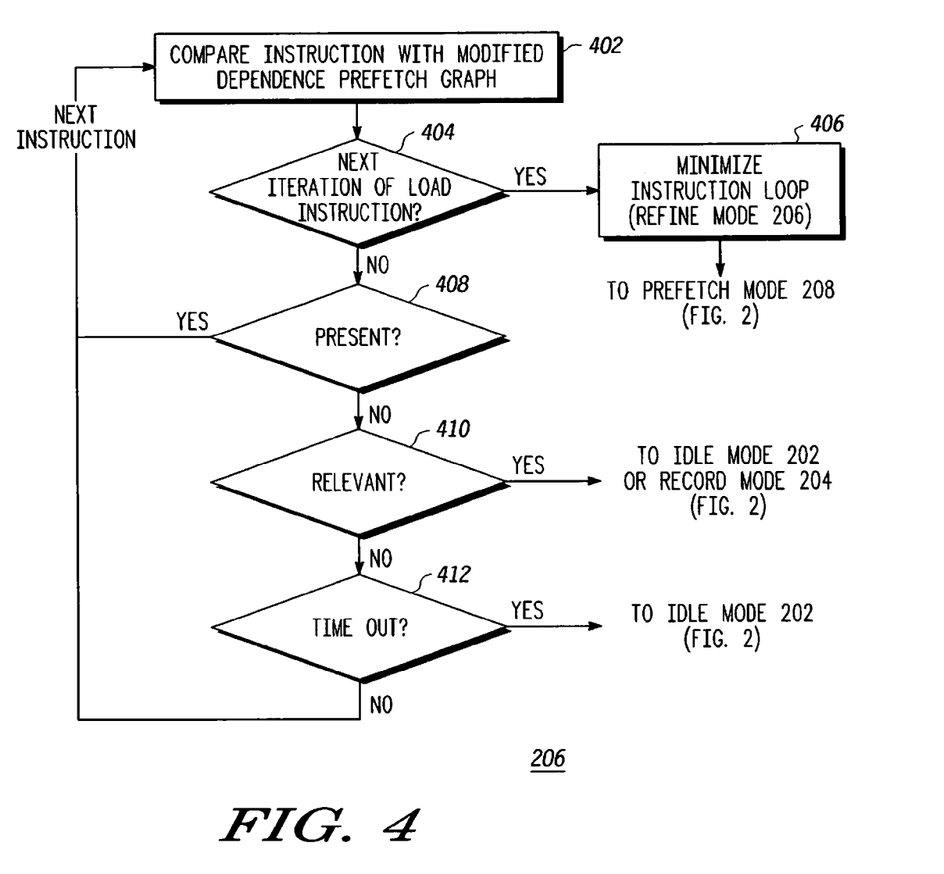
FIG. 4 is a flow diagram illustrating an exemplary verify mode of the state machine of FIG. 2.

Referring to FIG. 4, a flow diagram illustrating an exemplary implementation of verify mode 206 of the state machine 200 of FIG. 2 is illustrated in accordance with at least one embodiment of the present disclosure.

As discussed above, the PCE 116 enters verify mode 206 to verify that the instruction loop represented by the dependence prefetch graph of the DGC 124 represents the relevant instructions likely to occur between iterations of the delinquent load instruction. Accordingly, upon detecting an iteration of the delinquent load instruction in the program stream at the CPU 102, the control module 120 compares the next committed instruction with the dependence prefetch graph at block 402 (e.g., by searching based on the PC values). The control module 120 determines at block 404 whether the next committed instruction is the next iteration of the delinquent load instruction. If so, the PCE 120 enters refine mode 206 at block 406 so as to refine the dependence prefetch graph and to begin prefetching data (during prefetch mode 208) for iterations of the delinquent load instruction. The process of refinement includes removing instructions identified as not affecting the load address value of the delinquent load instruction. As part of the refining process, instructions in the dependence prefetch graph are subjected to one or more filtering processes so as to filter out instructions that are not relevant to the load address value utilized by the delinquent load instruction. The filtering of instructions includes filtering based on instruction type and/or address value. For instruction-type filtering, only certain types of instructions are permitted to be included in the resulting refined dependence prefetch graph stored in the DGC 124. For example, because the load address value used by the delinquent load instruction typically is only affected by load instructions or add instructions (where add instructions can include subtraction instructions and integer shift instructions), the control module 120 filters out instructions that are neither load instructions nor add instructions. Moreover, because the load address value typically is an integer value, load instructions that load non-word or non-integer values and add instructions that operate on non-word or non-integer values are also unlikely to affect a load address value used by the delinquent load instruction. Accordingly, load instructions and add instructions that operate with non-word values or non-integer values also are filtered out of the dependence prefetch graph.

For address-type filtering, those load instructions that load their values off of the program stack are filtered out because they are either parameters for a current function or they are temporary stored values. In either case, they typically are used in other load or add instructions if they are relevant to calculation of the load address value for the delinquent load instruction. Accordingly, to identify such load instructions for filtering, the Nth (e.g., N=8) most significant bits of the load address value of the load instruction being recorded are compared with the Nth most significant bits of the load address value of the delinquent load instruction. If they differ, the load instruction being recorded is filtered out of the dependence prefetch graph.

As another part of the refinement process, the control module 120 implements a producer/consumer analysis using the produce and consume fields in the DGC 124 so as to remove non-relevant instructions. As part of this analysis, those instructions that do not "produce" a value that is "consumed" by a subsequent instruction (determined by comparing the consume field of an instruction with the produce fields of previous instructions) are filtered out of the resulting refined dependence prefetch graph.

The process of refinement then may be completed by starting at the first instruction, which is the delinquent load instruction, and checking the PI field. If the PI field has the predetermined value (e.g., −1), then the dependencies were not detected and the PCE 116 is retired. Otherwise, the PI entry is checked to identify its producer ID in the PI field. This process repeats until a self-referencing instruction, if any, is found in the path. If a self-referencing instruction is found, the dependence prefetch graph is considered complete. Otherwise, the PCE 116 is retired.

Otherwise, at block 408 the PCE 116 determines whether the committed instruction is present in the refined dependence prefetch graph. If the committed instruction is detected as present in the refined dependence prefetch graph, the control module 120 returns to block 402 and awaits the next committed instruction. Otherwise, at block 410 the control module 120 determines whether the committed instruction is a relevant instruction (e.g., by instruction-type filtering, by address filtering, and/or by producer/consumer analysis, as described below). A determination that the committed instruction is relevant indicates that the dependence prefetch graph does not fully represent the relevant instructions occurring between iterations of the delinquent load instruction and therefore is less likely to accurately prefetch data. Accordingly, when a relevant committed instruction is detected as not present in the dependence prefetch graph, the PCE 116 reenters idle mode 202 to await allocation to a different delinquent load instruction or the PCE 116 reenters record mode 204 in an attempt to record a different dependence prefetch graph for the delinquent load instruction.

A timer/counter is accessed at block 412 to determine whether too much time has passed or too many instructions have passed after the first iteration of the delinquent load instruction during verify mode 206. If timed out, the PCE 202 returns to idle mode 202 to await allocation to a different delinquent load instruction. Otherwise, the PCE 202 returns to block 402 for the next committed instruction.

Figure 5:
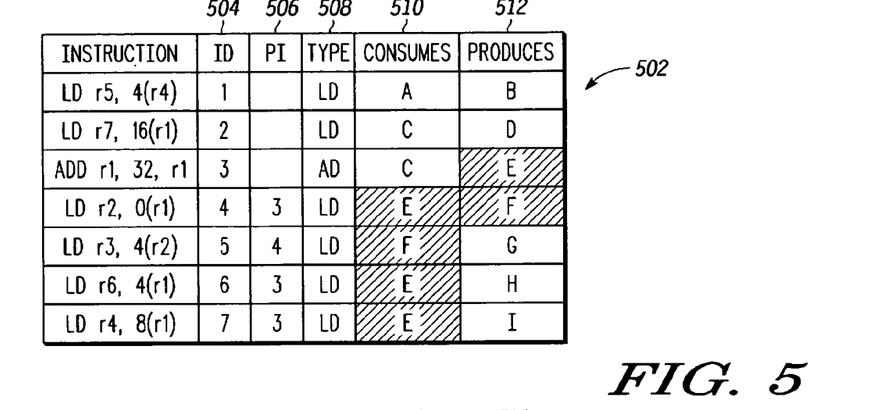
FIGS. 5-7 are diagrams illustrating exemplary dependence prefetch graphs created using the precomputation prefetching engine of FIG. 1.
Figure 6:
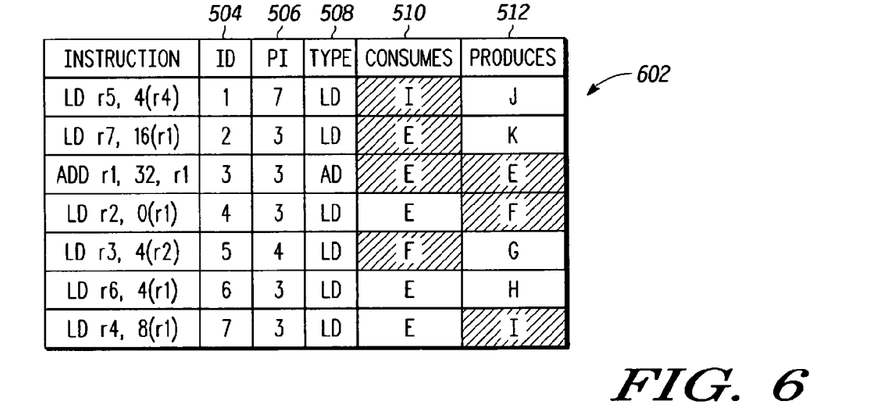
Figure 7:
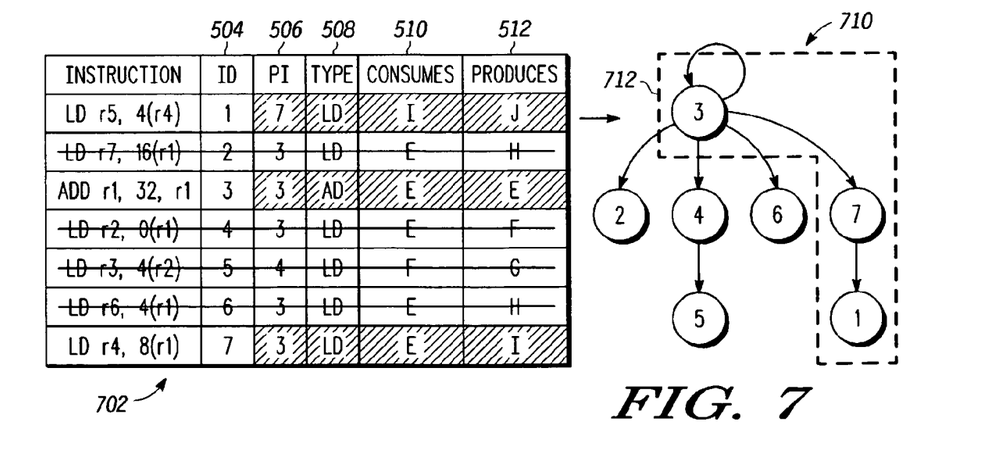

Referring to FIGS. 5-7, exemplary charts depicting the dependence prefetch graph recordation, verification and refinement process are illustrated in accordance with at least one embodiment of the present disclosure. For the following examples, assume that the PCE 116 records and filters the following sequence of instructions between two iterations of a delinquent load instruction, LD r5, 4(r4):

| | |
|---|---|
| 1. | LD r5, 4(r4) |
| 2. | LD r7, 16(r1) |
| 3. | ADD r1, 32, r1 |
| 4. | LD r2, 0(r1) |
| 5. | LD r3, 4(r2) |
| 6. | LD r6, 4(r1) |
| 7. | LD r4, 8(r1) |

FIG. 5 illustrates an initial dependence prefetch graph 502 generated during record mode 204 during a first iteration. The graph 502 includes ID field 504, PI field 506, type field 508, consume field 510 and produce field 512. As shown, instruction ID 3 (ADD r1, 32, r1) produces register value E, while instruction ID 4 (LD r2, 0(r1)), instruction ID 6 (LD r6, 4(r1)) and instruction ID 7 (LD r4, 8(r1)) consume register value E. Thus, under a producer/consumer analysis, instruction IDs 4, 6 and 7 are dependent on instruction ID 3.

FIG. 6 illustrates a dependence prefetch graph 602 generated from the dependence prefetch graph 502 during verify mode 206 for a second iteration. As shown, instruction ID 1 (LD r5, 4(r4)) consumes register value I and instruction ID 7 (LD r4, 8(r1)) consume register value I, and instruction ID 1 therefore is dependent on instruction ID 7 in a producer/consumer analysis. Similarly, instruction ID 2 (LD r7, 16(r1)) is dependent on instruction ID 3 (ADD r1, 32, r1) because instruction ID 2 consumes register value E, which is produced by instruction ID 3.

FIG. 7 illustrates a dependence prefetch graph 702 generated from the dependence prefetch graph 602 during refine mode 208. As shown, instruction ID 1 (LD r5, 4(r4)) consumes register value I and produces register value J, instruction ID 3 (ADD r1, 32, r1) consumes register value E, and instruction ID 7 (LD r4, 8(r1)) produces register value E and produces register value I. Thus, as illustrated by the linking chart 710 of FIG. 7, the path 712 of instructions relevant to the load address of the delinquent load includes instruction IDs 3, 7 and 1, where instruction ID 3 is dependent on instruction ID 7 and instruction ID 7 is dependent on instruction ID 1. Thus, the instruction loop to be executed includes the sequence: instruction ID 1, instruction ID 3, and instruction ID 7.

Figure 8:
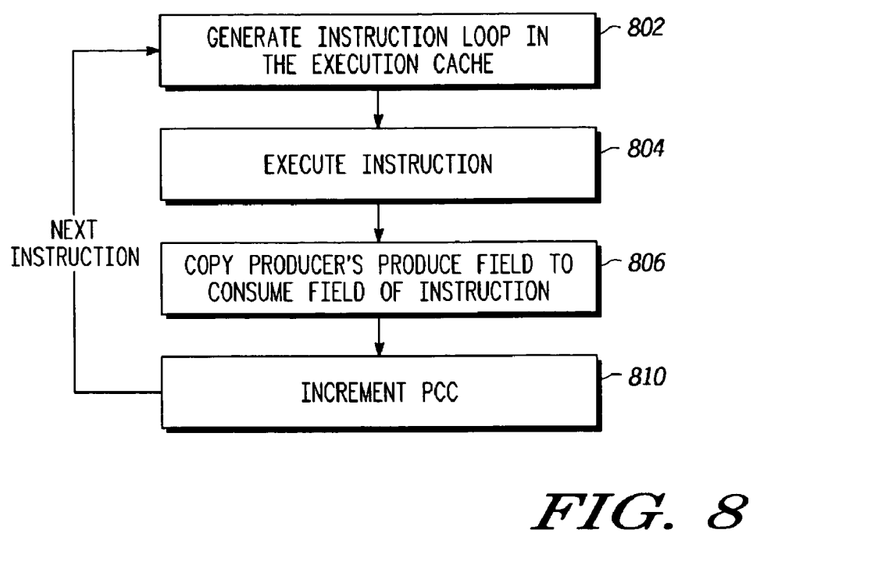
FIGS. 8 and 9 are flow diagrams illustrating an exemplary prefetch mode of the state machine of FIG. 2.
Figure 9:
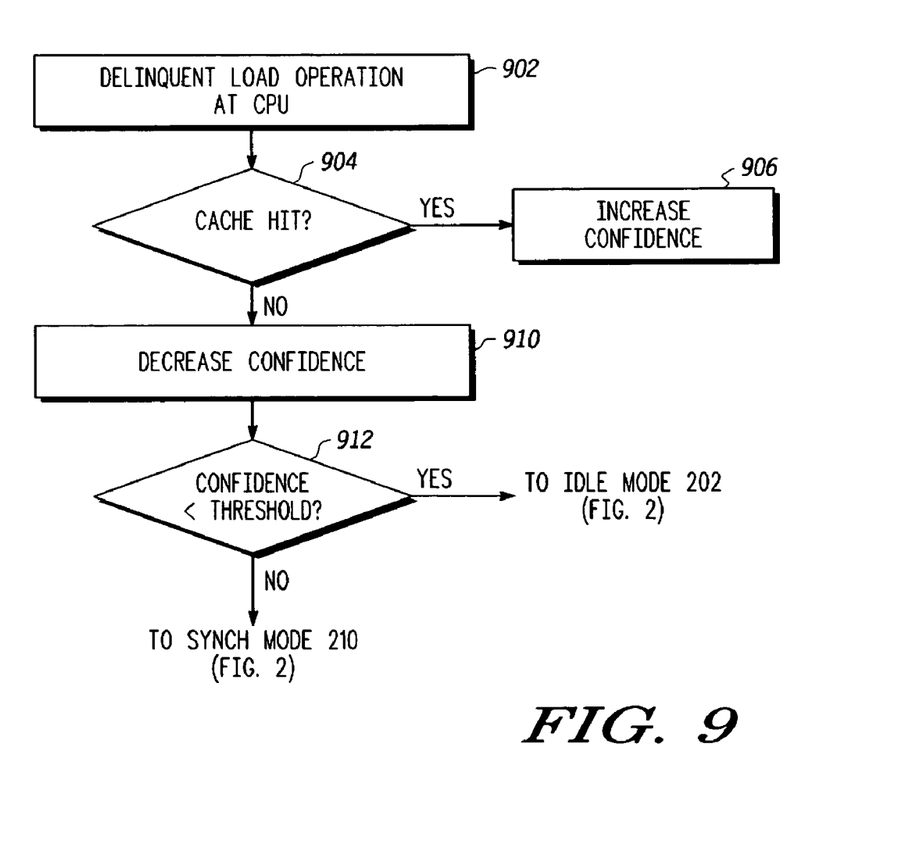

Referring now to FIGS. 8 and 9, flow diagrams depicting an exemplary implementation of prefetch mode 210 of the state machine 200 of FIG. 2 are illustrated in accordance with at least one embodiment of the present disclosure. At block 802 of FIG. 8, an instruction loop representative of the minimum set of instructions determined during refine mode 208 is generated in or copied to the EXC 126. The instructions of the instruction loop are ordered starting with the first entry being the self-referencing instruction and ending at the delinquent load instruction. At block 804, the add/execution module 122 then starts execution at the first entry. If the entry is an add type an addition is made by adding the base value and the offset value and storing the result in the produce field of the corresponding entry in the EXC 126. As each instruction is executed, it sources its producer's produce field and stores it into its consume field at block 806.

If the instruction is an add instruction, it typically executes in one cycle and updates its produce field. If the instruction is a load instruction, an address is composed by adding the base (consume) value and the offset value. The address then is sent to the cache 108 as a load instruction through the cache's prefetch port. Upon a cache hit, the loaded value is recorded in the produce field of the instruction's entry in the EXC 126 and the instruction is marked as complete. If there is a cache miss, the address is sent as a prefetch request to the LSU 104 via the prefetch queue 114 and the PCE 116 is stalled until the prefetch is resolved and the data is filled in the cache 108. If the load instruction that misses in the cache 108 is the delinquent load instruction and there is no consumer instruction for its produced value, then the PCE 116 will not stall because there are no dependant instructions on the loaded value, and execution therefore can proceed at the first entry in the EXC 126.

The above-described mechanism permits the PCE 116 to run decoupled from the execution of the program stream at the CPU 102, thereby allowing the PCE 116 to run ahead and creating an effect similar to running a helper thread in simultaneous multithreading (SMT) environments.

FIG. 9 describes a mechanism to prevent the PCE 116 from prefetching too many instances that are not likely to be used and to direct the PCE 116 to change its path based on dynamic changes that the program stream undertakes, especially when the paths along the data structures change based on values stored in the data structures. In addition, as noted above the offset is assumed to be constant even though it may not always be constant. This assumption is based on the fact that prefetching works on the cache level granularity, and as long as the correct cache line is prefetched, the manner in which the cache line was identified is secondary. Therefore, if the offset value changes such that it results in a value that is within the same cache line as the initial offset value, the overall assumption that the offset is fixed would be valid. However, such an assumption may be true for a number of accesses, after which the PCE 116 might lose its ability to generate addresses within the same cache line because the actual offset has changed significantly from the time when it was recorded. Because of all of these reasons, a loose coupling of the prefetch engine is useful to enable the engine to re-synchronize with the state of the program stream whenever such cases arise.

At block 902, the CPU 102 executes an instance of the delinquent load instruction and information regarding the performance of an attempted cache access for the load data is provided to the control module 120 of the PCE 116. If it is determined at block 904 that there was a cache hit for the load data to a prefetched cache line, the confidence of the PCE 116 is increased at block 906 by, for example, incrementing a confidence value or moving the PCE 116 to a higher confidence level. Otherwise, there was a cache miss and the confidence of the PCE 116 is decreased at block 910 by, for example, decrementing a confidence value or moving the PCE 116 to a lower confidence level.

At block 912, the confidence of the PCE 116 is compared to a minimum threshold confidence (e.g., a minimum value or a minimum confidence level). In the event that the confidence of the PCE 116 falls below this minimum threshold confidence, the PCE 116 is retired and returns to idle mode 202 (FIG. 2). Otherwise, the PCE 116 enters synch mode 212 (FIG. 2), during which the PCE 116 updates the fields of the entries for the instructions in the relevant path. After updating, the PCE 116 reenters the prefetch mode 210. Exemplary mechanisms for monitoring and adjusting the confidence of a prefetch engine are described in detail in U.S. patent application Ser. No. 11/120,287 (client reference no.: SC14302TH).

Referring to FIG. 10, an exemplary processing system 1000 using collaborative prefetching is illustrated in accordance with at least one embodiment of the present disclosure. As similarly described with respect to the processing system 100 of FIG. 1, the processing system 1000 includes the CPU 102, the LSU 104, the BIU 106, the cache 108, the memory 110, the reorder buffer 112, and the prefetch queue 114. In addition, the processing system 1000 includes a prefetch module 1002 that implements a plurality of prefetch engines, including one or more precomputation prefetch engines (PCEs), such as PCEs 1006-1008, and one or more stride-based prediction prefetch engines (SPEs), such as SPEs 109-1011. The prefetch module 1002 further includes a control module 1020 to facilitate the operation of the prefetch module 1002.

After a delinquent load instruction is detected in the program stream executed at the CPU 102 (e.g., when there is a cache miss during an iteration of the load instruction), the prefetch module 1002 is utilized to prefetch data for subsequent iterations of the load instruction. The delinquent load instruction is allocated to both a PCE and an SPE, if available. The PCE and SPE then run concurrently, each attempting to prefetch data for iterations of the load instruction based on the decoupled precomputation techniques described above for the PCE or based on stride predictions for the SPE. The prefetch performances of the prefetches performed by the PCE and the SPE are monitored and the respective confidences of the PCE and SPE are adjusted accordingly. The first prefetch engine of the PCE and SPE to reach a predetermined confidence is assumed to be the more effective prefetch engine and therefore is selected to continue prefetching data for the delinquent load instruction while the remaining prefetch engine is retired. In an alternate embodiment, the confidences of the SPE and the PCE are compared after a certain elapsed time or a certain number of instructions and the prefetch engine with the lower confidence value is retired. Moreover, if the confidence of the prefetch engine that was selected to continue falls below a minimum threshold confidence, the selected prefetch engine is retired and the allocation process is reinitialized or the delinquent load instruction is identified as not suitable for prefetching.

Communication between the prefetch engines is centralized (e.g., via the control module 1020) or decentralized, or some combination thereof. In a centralized approach, the control module 1020 polls the prefetch engines to determine their availability, allocates the delinquent load instructions to identified prefetch engines, monitors their performance, and retires them as appropriate. In the decentralized approach, the prefetch engines communicate their status among themselves and adjust their operations accordingly. For example, upon notification of a delinquent load instruction, the prefetch engines could volunteer to accept the assignment and signal their acceptance to the other prefetch engines. As each prefetch engine develops the prefetch strategy and begins prefetching, the prefetch engine broadcasts information regarding its current status. This information can include, for example, the PC value of its allocated delinquent load instruction and its current confidence. Upon receiving this information, the other prefetch engines adjust their operations accordingly. To illustrate, assume that PCE 1006 and SPE 1009 are both allocated to a particular delinquent load instruction and at time A the PCE 1006 broadcasts the PC value of the delinquent load instruction and its current confidence at level 3 and the SPE 1009 broadcasts the PC value of the delinquent load instruction and its current confidence at level 6. The PCE 1006, upon receiving the information from the SPE 1009, determines that the SPE 1009 has a higher confidence for the delinquent load instruction and therefore retires itself from prefetching for the delinquent load instruction. Conversely, the SPE 1009, upon receiving the information from the PCE 1006, determines that it has the higher confidence level and therefore continues to perform prefetches for the delinquent load instruction.

Referring to FIG. 11, an exemplary method 1100 for collaborative prefetching is illustrated in accordance with at least one embodiment of the present disclosure. At block 1102, a delinquent load instruction is detected. At block 1104, one or both of an SPE and a PCE are allocated, if available, to the delinquent load instruction. As discussed above, the control module 1020 directs the allocation or, alternately, the allocation occurs among the prefetch engines of the prefetch module 1002.

At block 1106 the allocated PCE generates an instruction loop based on relevant instructions as described above and repeatedly executes the instruction loop for prefetching data for iterations of the delinquent load instruction. At block 1108, the allocated SPE analyzes the program stream pattern to identify a stride pattern, if any, and prefetches data based on this stride pattern. Moreover, the prefetch performances of the PCE and the SPE are monitored at blocks 1106 and 1108, respectively.

At block 1110, the allocated prefetch engine having the lower confidence is assumed to be the lower performing prefetch engine and is retired accordingly. The comparison of confidences occurs after a certain elapsed time or after a certain number of committed instructions. Alternately, the retirement of one of the prefetch engines is triggered in response to the other prefetch engine reaching a predetermined confidence first. At block 1112, the non-retired prefetch engine continues to prefetch data for one or more iterations of the delinquent load instruction. At block 1114, the current confidence of the non-retired prefetch engine is compared to a minimum threshold confidence. If the current confidence is below this threshold, at block 1116 the non-retired confidence engine is either retired or enters synch mode 212 (FIG. 2) so as to update its prefetch parameters.

The mechanism exemplarily described by FIGS. 10 and 11 facilitates collaborative prefetching whereby two (or more) prefetch engines utilizing different prefetch techniques attempt to implement effective prefetching. In certain instances, a stride-based prefetch may be more effective than a precomputation-based prefetch, or vice versa. Accordingly, both prefetching techniques initially are implemented and the prefetch engine implementing the less effective prefetch technique eventually is retired so as to make it available for another delinquent load instruction.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
 identifying a first load instruction of a program stream executed by a processing unit as delinquent based on a buffer miss during an iteration of the first load instruction;
 performing a first prefetching process at a first prefetch unit for one or more iterations of the first load instruction for prefetching data from memory into a buffer, the first prefetching process based on an expected stride pattern of the one or more iterations of the first load instruction;
 performing a second prefetching process at a second prefetch unit for one or more iterations of the first load instruction for prefetching data from memory into the buffer, the second prefetching process based on an instruction loop that represents a subset of a sequence of instructions between iterations of the first load instruction that affect an address value associated with the first load instruction;
 determining a first confidence value for the first prefetching process based on a prefetch performance of the first prefetching process;
 determining a second confidence value for the second prefetching process based on a prefetch performance of the second prefetching process; and
 terminating execution of one of the first prefetching process or the second prefetching process based on a comparison of the first confidence value and the second confidence value.

2. The method of claim 1, wherein:
 the first prefetching process is terminated if the first confidence value is less than the second confidence value; and
 the second prefetching process is terminated if the second confidence value is less than or equal to the first confidence value.

3. The method of claim 1, wherein:
 determining the first confidence value comprises:
  incrementing the first confidence value if a buffer hit occurs in the data prefetched by the first prefetching process during an iteration of the first load instruction; and
  decrementing the first confidence value if a buffer miss occurs during an iteration of the first load instruction; and
 determining the second confidence value comprises:
  incrementing the second confidence value if a buffer hit occurs in the data prefetched by the second prefetching process during an iteration of the first load instruction; and
  decrementing the second confidence value if a buffer miss occurs during an iteration of the first load instruction.

4. The method of claim 1, wherein the first prefetching process is performed by a first prefetch unit and the second prefetching process is performed by a second prefetch unit different than the first prefetching unit.

5. The method of claim 4, wherein the first and second prefetching processes are performed substantially in parallel.

6. The method of claim 1, wherein performing the second prefetching process comprises:
 generating a first prefetching graph based on a sequence of instructions of the program stream that are committed to an execution pipeline of the processing unit between a first iteration and a second iteration of a first load instruction;
generating a second prefetching graph from the first prefetching graph based on a first subset of the sequence of instructions that affect an address value associated with the first load instruction; and
generating the instruction loop based on the second prefetching graph.

7. The method of claim 6, wherein generating the first prefetching graph includes filtering out an instruction from the sequence of instructions based on a comparison of an instruction type of the instruction with an identified set of one or more instruction types.

8. The method of claim 6, wherein generating the first prefetching graph further includes filtering out a second load instruction from the sequence of instructions based on a comparison of an address value of the first load instruction with an address value of the second load instruction.

9. The method of claim 6, wherein generating the second prefetching graph comprises:
filtering out an identified instruction of the sequence of instructions that uses an operand value that is not affected by another instruction of the sequence of instructions that is prior to the identified instruction.

10. A method comprising:
allocating a first prefetch engine from a first plurality of prefetch engines to a first load instruction in response to a buffer miss of an iteration of the first load instruction in a program stream, the first plurality of prefetch engines comprising prefetch engines for prefetching data from memory to a buffer based on a predicted stride;
allocating a second prefetch engine from a second plurality of prefetch engines to the first load instruction in response to the buffer miss of the iteration of the first load instruction, the second plurality of prefetch engines comprising prefetch engines for prefetching data from memory to the buffer based on an instruction loop representative of a sequence of instructions that affect an address value associated with an allocated load instruction; and
deallocating one of the first or second prefetch engines if the other of the first or second prefetch engines achieves a prefetch performance greater than a first threshold value.

11. The method of claim 10, further comprising:
allocating a third prefetch engine from one of the first or second pluralities of prefetch engines if the prefetch performance of the other of the first or second prefetch engines achieves a prefetch performance less than a second threshold.

12. The method of claim 10, further comprising:
identifying a first available prefetch engine of the first plurality of prefetch engines, wherein the first prefetch engine comprises the first available prefetch engine; and
identifying a second available prefetch engine of the second plurality of prefetch engines, wherein the second prefetch engine comprises the second available prefetch engine.

13. The method of claim 12, wherein a prefetch engine is characterized as being available either if it is not allocated or if it is allocated and a prefetch performance associated with the prefetch engine is less than a second threshold value.

14. The method of claim 10, further comprising:
deallocating both of the first and second prefetch engines if neither of the first or second prefetch engines achieves a prefetch performance greater than the first threshold value.

15. The method of claim 10, wherein the program stream further comprises multiple iterations of a second load instruction and wherein the method further comprises:
allocating a third prefetch engine from the first plurality of prefetch engines to the second load instruction in response to a buffer miss of an iteration of the second load instruction in the program stream;
allocating a fourth prefetch engine from the second plurality of prefetch engines to the second load instruction in response to the buffer miss of the iteration of the second load instruction; and
deallocating one of the third or fourth prefetch engines if the other of the third or fourth prefetch engines achieves a prefetch performance greater than the first threshold value.

16. A system comprising:
a processing unit to execute a program stream comprising multiple iterations of a first load instruction;
a first plurality of prefetch engines, wherein each prefetch engine of the first plurality of prefetch engines is for prefetching data from memory to a buffer based on a predicted stride of a load instruction allocated to the prefetch engine;
a second plurality of prefetch engines, wherein each prefetch engine of the second plurality of prefetch engines is for prefetching data from memory to a buffer based on based on an instruction loop representative of a sequence of instructions that affect an address value associated with a load instruction allocated the prefetch engine; and
wherein a first prefetch engine from the first plurality of prefetch engines is allocated to the first load instruction in response to a buffer miss of an iteration of the first load instruction in the program stream;
wherein a second prefetch engine from the second plurality of prefetch engines is allocated to the first load instruction in response to the buffer miss of the iteration of the first load instruction; and
wherein one of the first or second prefetch engines is deallocated if the other of the first or second prefetch engines achieves a prefetch performance greater than a first threshold value.

17. The system of claim 16, wherein a third prefetch engine from one of the first or second pluralities of prefetch engines is allocated if the prefetch performance of the other of the first or second prefetch engines achieves a prefetch performance less than a second threshold value.

18. The system of claim 16, wherein both of the first and second prefetch engines are deallocated if neither of the first or second prefetch engines achieves a prefetch performance greater than the first threshold value.

19. The system of claim 16, wherein the program stream further comprises multiple iterations of a second load instruction and wherein:
a third prefetch engine from the first plurality of prefetch engines is allocated to the second load instruction in response to a buffer miss of an iteration of the second load instruction in the program stream;
a fourth prefetch engine from the second plurality of prefetch engines is allocated to the second load instruction in response to the buffer miss of the iteration of the second load instruction; and one of the third or fourth prefetch engines is deallocated if the other of the third or fourth prefetch engines achieves a prefetch performance greater than the first threshold value.

20. The system of claim 16, wherein the buffer comprises a level 1 cache.

* * * * *